US007590303B2

(12) United States Patent
Lee et al.

(10) Patent No.: US 7,590,303 B2
(45) Date of Patent: Sep. 15, 2009

(54) IMAGE ENHANCEMENT METHOD USING LOCAL ILLUMINATION CORRECTION

(75) Inventors: Sangkeun Lee, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 473 days.

(21) Appl. No.: 11/240,306

(22) Filed: Sep. 29, 2005

(65) Prior Publication Data

US 2007/0071350 A1 Mar. 29, 2007

(51) Int. Cl.
*G06K 9/40* (2006.01)

(52) U.S. Cl. ........................................ 382/274; 382/260

(58) Field of Classification Search .................. 382/260
See application file for complete search history.

(56) References Cited

U.S. PATENT DOCUMENTS

| | | | | |
|---|---|---|---|---|
| 4,499,493 | A * | 2/1985 | Nishimura | 378/98.9 |
| 4,937,878 | A * | 6/1990 | Lo et al. | 382/103 |
| 5,294,989 | A * | 3/1994 | Moore et al. | 348/241 |
| 5,689,591 | A * | 11/1997 | Balram et al. | 382/276 |
| 5,703,644 | A * | 12/1997 | Mori et al. | 348/363 |
| 5,940,530 | A * | 8/1999 | Fukushima et al. | 382/164 |
| 5,991,456 | A * | 11/1999 | Rahman et al. | 382/254 |
| 6,018,588 | A * | 1/2000 | Kim | 382/167 |
| 6,034,710 | A * | 3/2000 | Kawabe et al. | 347/236 |
| 6,049,626 | A * | 4/2000 | Kim | 382/167 |
| 6,078,686 | A * | 6/2000 | Kim | 382/167 |
| 6,163,337 | A * | 12/2000 | Azuma et al. | 348/43 |
| 6,288,545 | B1 * | 9/2001 | King et al. | 324/318 |
| 6,408,103 | B1 * | 6/2002 | Gallagher et al. | 382/260 |
| 6,473,525 | B1 * | 10/2002 | Cheung et al. | 382/199 |
| 6,507,372 | B1 * | 1/2003 | Kim | 348/630 |
| 6,631,206 | B1 * | 10/2003 | Cheng et al. | 382/164 |
| 6,633,683 | B1 * | 10/2003 | Dinh et al. | 382/260 |
| 6,731,790 | B1 * | 5/2004 | Van de Velde et al. | 382/162 |
| 6,788,822 | B1 * | 9/2004 | Zhang et al. | 382/254 |
| 6,941,028 | B2 * | 9/2005 | Kimmel et al. | 382/274 |
| 6,978,045 | B1 * | 12/2005 | Hashimoto et al. | 382/199 |

(Continued)

OTHER PUBLICATIONS

E.H. Land, *Color Vision and the Natural Image*, Proc. Nat. Acad. Sci., pp. 115-129, 1959, vol. 45.

(Continued)

*Primary Examiner*—Vikkram Bali
*Assistant Examiner*—Michelle Entezari
(74) *Attorney, Agent, or Firm*—Kenneth L. Sherman, Esq.; Michael Zarrabian, Esq.; Myers Andras Sherman LLP

(57) ABSTRACT

An image processing system for implementing a variant of Retinex algorithm based on local illumination correction is provided to improve an intensity value of each position of an input image. The image processing system provides the ability to distinguish details when compressing dynamic range of a given image. Specifically, first the illumination of the image is estimated by performing a weighted low pass filter (WLPF) operation, and the original image is separated into the illumination and the reflectance images. Next, the estimated illumination is modified by using a non-linear mapping function based on local illumination at each pixel location. Then, the modified illumination image is combined with the reflectance image. Finally, an enhanced image is obtained after a contrast correction procedure.

16 Claims, 4 Drawing Sheets

U.S. PATENT DOCUMENTS

| | | | | |
|---|---|---|---|---|
| 6,980,691 | B2 * | 12/2005 | Nesterov et al. | 382/165 |
| 7,215,365 | B2 * | 5/2007 | Cooper | 348/223.1 |
| 7,257,271 | B2 * | 8/2007 | Adams et al. | 382/275 |
| 7,269,296 | B2 * | 9/2007 | Wang et al. | 382/275 |
| 2002/0106133 | A1 * | 8/2002 | Edgar et al. | 382/261 |
| 2002/0113800 | A1 * | 8/2002 | Jones et al. | 345/589 |
| 2002/0130893 | A1 * | 9/2002 | Okuda | 345/691 |
| 2002/0163595 | A1 * | 11/2002 | Adams | 348/628 |
| 2002/0163805 | A1 * | 11/2002 | Hubbell et al. | 362/247 |
| 2002/0172431 | A1 * | 11/2002 | Atkins et al. | 382/260 |
| 2002/0186893 | A1 * | 12/2002 | Marmarelis | 382/260 |
| 2003/0012448 | A1 * | 1/2003 | Kimmel et al. | 382/274 |
| 2003/0016306 | A1 * | 1/2003 | Ogata et al. | 348/671 |
| 2003/0053697 | A1 * | 3/2003 | Aylward et al. | 382/203 |
| 2003/0097068 | A1 * | 5/2003 | Hossack et al. | 600/443 |
| 2003/0128893 | A1 * | 7/2003 | Castorina et al. | 382/284 |
| 2003/0152275 | A1 * | 8/2003 | Chung et al. | 382/218 |
| 2003/0156761 | A1 * | 8/2003 | Ogata et al. | 382/251 |
| 2003/0174887 | A1 * | 9/2003 | Oh et al. | 382/168 |
| 2003/0179945 | A1 * | 9/2003 | Akahori | 382/260 |
| 2004/0012582 | A1 * | 1/2004 | Kim | 345/204 |
| 2004/0061695 | A1 * | 4/2004 | Correa et al. | 345/211 |
| 2004/0086193 | A1 * | 5/2004 | Kameyama et al. | 382/254 |
| 2004/0086194 | A1 * | 5/2004 | Allouche | 382/260 |
| 2004/0213478 | A1 * | 10/2004 | Chesnokov | 382/260 |
| 2005/0074163 | A1 * | 4/2005 | Shaked | 382/162 |
| 2005/0104974 | A1 * | 5/2005 | Watanabe et al. | 348/222.1 |
| 2005/0107957 | A1 * | 5/2005 | Heath et al. | 702/19 |
| 2005/0128355 | A1 * | 6/2005 | Kang et al. | 348/606 |
| 2005/0157939 | A1 * | 7/2005 | Arsenault et al. | 382/260 |
| 2005/0206745 | A1 * | 9/2005 | Daiku et al. | 348/226.1 |
| 2005/0254721 | A1 * | 11/2005 | Hagiwara | 382/260 |
| 2005/0281458 | A1 * | 12/2005 | Adams et al. | 382/162 |
| 2006/0018516 | A1 * | 1/2006 | Masoud et al. | 382/115 |
| 2006/0045377 | A1 * | 3/2006 | Kawai | 382/274 |
| 2006/0062562 | A1 * | 3/2006 | Utagawa | 396/213 |
| 2006/0110052 | A1 * | 5/2006 | Finlayson | 382/232 |
| 2006/0110062 | A1 * | 5/2006 | Chiang et al. | 382/260 |
| 2006/0164557 | A1 * | 7/2006 | Fukuda | 348/650 |
| 2006/0176313 | A1 * | 8/2006 | Xu et al. | 345/603 |
| 2006/0182360 | A1 * | 8/2006 | Lee et al. | 382/254 |
| 2006/0241349 | A1 * | 10/2006 | Gono | 600/160 |
| 2006/0245499 | A1 * | 11/2006 | Chiu et al. | 375/240.18 |
| 2006/0245661 | A1 * | 11/2006 | Beazley | 382/260 |
| 2007/0053003 | A1 * | 3/2007 | Loce et al. | 358/3.06 |

OTHER PUBLICATIONS

E.H. Land and J.J. McCan, *Lightness and Retinex Theory*, Journal of the Optical Society of America, pp. 1-11, 1971, vol. 61, No. 1.

E.H. Land, *The Retinex Theory of Color Vision*, Scientific America, pp. 108-128, 1977, vol. 237.

* cited by examiner

IMAGE ENHANCEMENT METHOD USING LOCAL ILLUMINATION CORRECTION

FIELD OF THE INVENTION

The present invention relates generally to digital image processing, and more particularly to systemically enhancing an image value by correcting the local illumination based on a Retinex algorithm.

BACKGROUND OF THE INVENTION

Image processing systems are at the heart of digital image revolution. These systems process the captured digital images to enhance the clarity and details of the images using image processing algorithms. Such algorithms result in images that are substantially more accurate and detailed than previously achieved using older analog methods.

There remains, however, a substantial difference between how an image is perceived by a human and an image captured and reproduced on a display medium. Despite the improvements gained by conventional digital image processing systems, such systems remain deficient in reproducing an image with the same level of detail, color constancy, and lightness of an actual scene as the eye, brain, and nervous system of a human being. This is due in part to the human nervous system having a greater dynamic range compression than is available on current digital systems, wherein dynamic range compression refers to the ability to distinguish varying levels of light.

Many techniques have been proposed to compensate for such lighting deficiency. Among such techniques is Retinex theory which reproduces an image similar to human visual perception. Retinex theory deals with compensation for illumination effects in images. Its primary goal is to decompose a given image S into two images: a reflectance image R, and an illumination image L, such that, at each point or pixel (x,y) in the image domain, $Y(x,y)=R(x,y)\cdot L(x,y)$. The benefits of such decomposition include the possibility of removing illumination effects of back/front lighting, and enhancing shots that include spatially varying illumination such as images that contain indoor and outdoor zones.

It is reported that Retinex techniques are particularly useful for enhancing boundaries between lighter and darker regions of an image. However, such techniques are unsatisfactory for a number of reasons. One critical reason is that the computational complexity for the Retinex techniques is high. As such, it is difficult and expensive to implement the Retinex algorithm in hardware. Therefore, there is a need for a simplified Retinex implementation.

BRIEF SUMMARY OF THE INVENTION

It is an object of the present invention to provide the ability to distinguish details when compressing dynamic range of a given image. Specifically, first the illumination of the image is estimated by performing a weighted low pass filter (WLPF) operation, and the original image is separated into the illumination and the reflectance images. Then, the estimated illumination is modified by using a non-linear mapping function based on local illumination at each pixel location. Then, the modified illumination image is combined with the reflectance image. Finally, an enhanced image is obtained after a contrast correction procedure.

Other features and advantages of the present invention will become apparent from the following specification taken in conjunction with the following drawings.

DETAILED DESCRIPTION OF THE INVENTION

Figure 1:
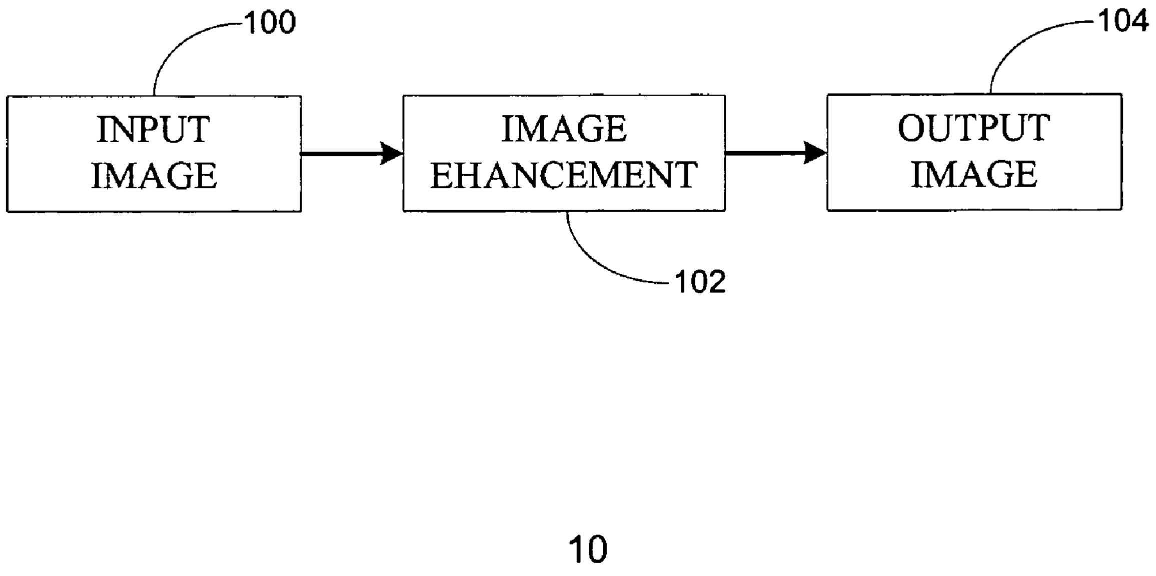
FIG. 1 shows a functional block diagram of an example image processing system according to an embodiment of the present invention.

Referring to the drawings, in one embodiment the present invention provides an image processing method and system that provides the ability to distinguish details when compressing dynamic range of a given image. Such a system and method enhances details for a digital image while preserving brightness and color constancy. The present invention is mainly based on the Retinex theory, which deals with the problem of separating the illumination from the reflectance in a given image. 'Skinning' the illumination L(x,y) from the given image Y(x,y) produces the reflectance image R(x,y), which is supposed to be free of non-uniform illumination, have a reduced dynamic range, and present a sharper view of the scene.

In one implementation of the image processing according to an embodiment of the present invention, first the illumination of the image is estimated by performing a weighted low pass filter (WLPF) operation, and the original image is separated into the illumination and the reflectance images. Then, the estimated illumination is modified by using a non-linear mapping function based on local illumination at each pixel location. Then, the modified illumination image is combined with the reflectance image. Finally, an enhanced image is obtained after a contrast correction procedure.

Referring now to FIG. 1, a block diagram of an example image processing system 10 which implements an embodiment of the method of the present invention is now described. An image is captured and digitized in the unit 100 according to techniques well-known to generate a digital image. The digital image is represented by discrete areas referred to as pixels. The digitized image is transformed to YUV space, wherein for each pixel Y represents luminance, U represents a first color difference, and V represents a second color difference (i.e., each pixel is assigned a YUV value). The Y value controls the brightness for that particular pixel. Current systems typically utilize eight bits to represent the Y value due to bandwidth efficiency and memory design considerations. Therefore, conventional image processing systems assign each pixel a Y value in the range of 0 to 255, with 0 representing the darkest luminance and 255 representing the brightest luminance.

According to the embodiments of the present invention described herein, the Y values of input image is input to the image enhancement unit 102 for image enhancement to generate enhance output image, which is transformed back to the original color space, or another color space, in the unit 104 as necessary.

The embodiments of the present invention described herein enhance the details in the darker regions of the digitally recorded images without washing out the details at the brighter ends, thereby making the digitally recorded images more realistic with respect to an actual viewer. In addition, these embodiments improve address graying out of large uniform zones of color which occurs using conventional techniques, and also essentially eliminate color shift since only the Y channel is operated on.

Figure 2:
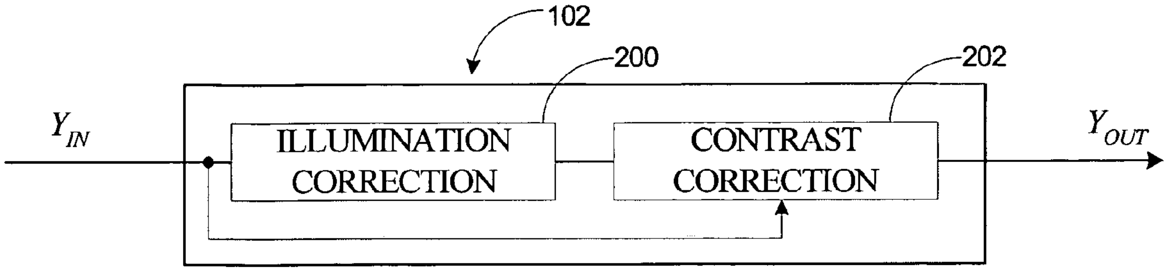
FIG. 2 shows a functional block diagram of an example image enhancer according to an embodiment of the present invention.

FIG. 2 shows a block diagram of an embodiment of the image enhancer 102 of the system 10 of FIG. 1. The image enhancer 102 comprises an illumination correction unit 200 and a contrast correction unit 202. The illumination correction unit 200 inputs an original input value $Y_{IN}$ and outputs a corrected value $Y'_{IN}$. The contrast correction unit 202 has two inputs, $Y'_{IN}$ and the original input $Y_{IN}$. The contrast correction unit 202 preserves the contrast range of $Y'_{IN}$ within that of $Y_{IN}$, to generate output value $Y_{OUT}$, according to relation (1) below:

$$Y_{OUT}(x, y) = \frac{\sigma_{IN}}{\sigma_{Y'_{IN}}} \cdot \{Y'_{IN}(x, y) - Y'_{mean}(x, y)\} + Y_{mean}(x, y). \tag{1}$$

In relation (1), $\sigma_z$ (e.g., $Z=Y_{IN}$, $Z=Y'_{IN}$) represents a standard deviation of an image Z (e.g., $Z=Y_{IN}$, $Z=Y'_{IN}$) and $Z_{mean}$ represents a mean value of Z at pixel location (x,y) in the image (i.e., x and y denote the pixel location in the image, where y is the row number and x is the column number in the row y).

Figure 3:
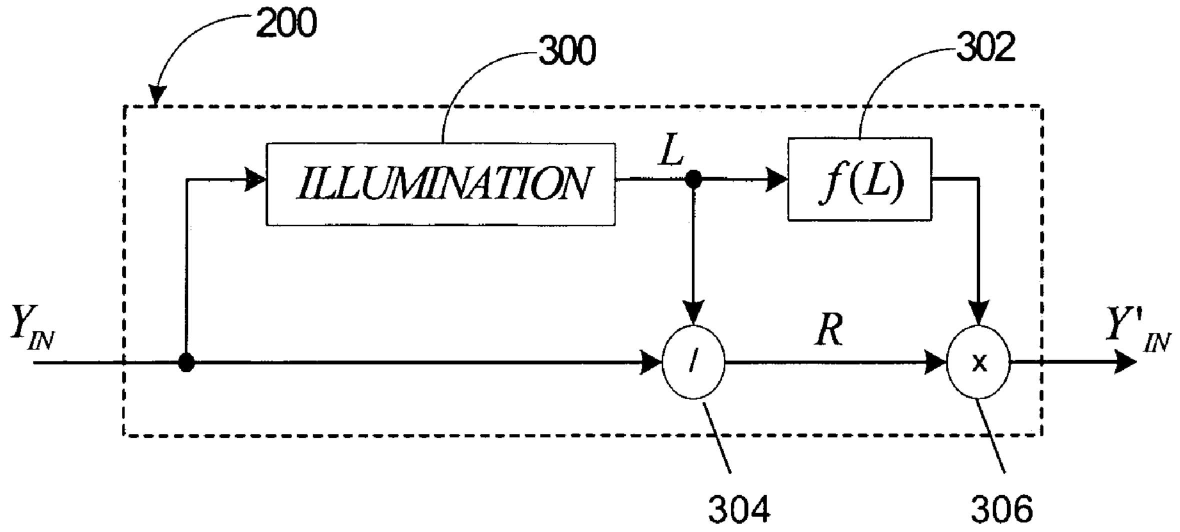
FIG. 3 shows a functional block diagram of an example illumination correction system according to an embodiment of the present invention.

FIG. 3 shows an embodiment of the illumination correction unit 200 of FIG. 2. According to the present invention, a non-log-domain based illumination correction method is utilized while conventional approaches are performed in log domain.

The illumination correction unit 200 comprises an illumination processing unit 300, an adjustment module including a mapping function unit 302, a separation module including a skinner 304, and a combiner 306. First, in the illumination processing unit 300, an illumination signal L is estimated from the input $Y_{IN}$ using a weighted low pass filter (WLPF). The estimated illumination signal L(x,y) for each pixel at location (x,y) is then adjusted in the mapping unit 302 by a nonlinear mapping function $f$, to generate the mapped output $f(L(x,y))$.

The skinner 304 received the input $Y_{IN}$ and separates the illumination L(x,y) from the given image $Y_{IN}$ (x,y) to generate the reflectance image R(x,y). In this example, the input $Y_{IN}$ is divided by illumination signal L to generate the reflectance signal R (i.e., $R(x,y)=Y_{IN}(x,y)/L(x,y)$). The output $f(L(x,y))$ of the mapping unit 302, and the reflectance signal output R(x,y) of the skinner 304 are combined in the combiner 306 to generate the output signal $Y'_{IN}$.

Let an input image $Y_{IN}(x,y)$ be expressed by multiplying illumination L(x,y) and reflectance R(x,y) components according to relation (2) below:

$$Y_{IN}(x,y)=L(x,y)\cdot R(x,y). \tag{2}$$

The illumination component L is estimated by the unit 300 using a weighted low pass filter of the size m×n, utilizing a weighting function g, according to relation (3) below:

$$L(x, y) = \frac{\sum_{i=1}^{m}\sum_{j=1}^{n} g(|Y_{IN}(i, j) - Y_{IN}(x, y)|) \cdot Y_{IN}(i, j)}{\sum_{i=1}^{m}\sum_{j=1}^{n} g(|Y_{IN}(i, j) - Y_{IN}(x, y)|)}, \tag{3}$$

wherein the weighting function g(X) can be defined by relation (4) below:

$$g(X) = \begin{cases} 0, \text{ if } X > \sigma\cdot\tau_2, \\ -\frac{1}{(\tau_2 - \tau_1)\cdot\sigma}\cdot(X - \sigma\cdot\tau_2), \text{ else if } X > \sigma\cdot\tau_1, \\ 1, \text{ otherwise.} \end{cases} \tag{4}$$

wherein X is an input intensity difference value, σ is a predefined variance, and $\tau_1$ and $\tau_2$ are first and second thresholds, respectively, for approximating the object function which in this example is expressed piecewise-linearly. In practice, the variance σ and the two threshold values $\tau_1$ and $\tau_2$ are assigned to e.g. 50, 0.5, and 1.5, respectively. To prevent the image detail (i.e., reflectance component in Retinex theory) from being modified inappropriately, the detail information R(x,y) (i.e., $Y_{IN}(x,y)/L(x,y)$) from the skinner 304 is multiplied with the processed signal $f(L(x,y))$ from the function 302 using the combiner 306, to generate $Y'_{IN}$.

Figure 4:
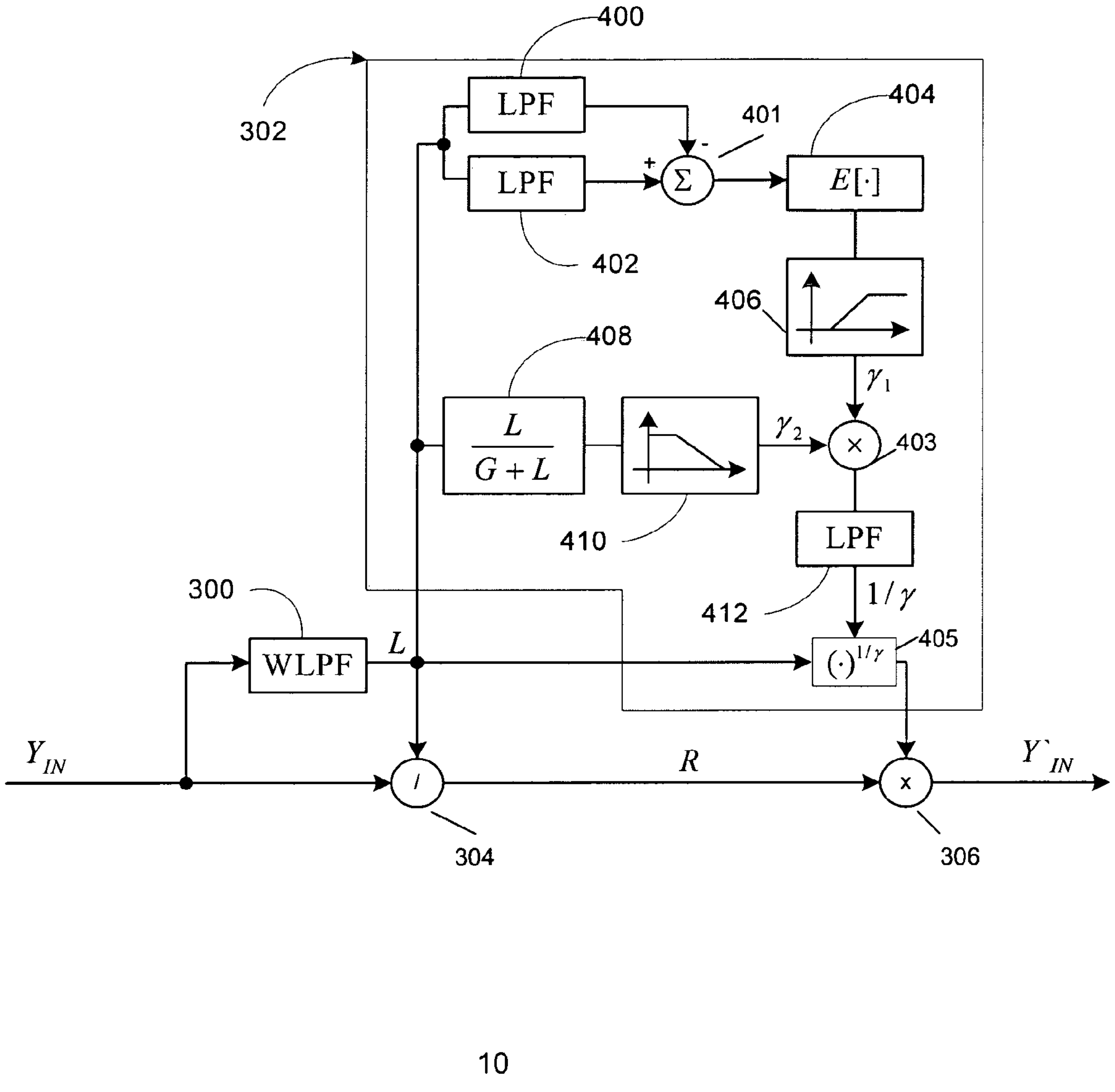
FIG. 4 shows a more detailed functional block diagram of the system of FIG. 1 according to an embodiment of the present invention.

FIG. 4 illustrates an embodiment of the mapping unit 302 of FIG. 2, in conjunction with the illumination correction unit 300 showing the aforementioned WLPF filter therein. The mapping unit 302 comprises low pass filters (LPF) 400 and 402, a summer 401, an averaging unit 404, an inverse threshold function 406, a multiplier 403, LPF 412, an exponent function 405, a brightness ratio function 408 and a threshold function 410.

The mapping unit 302 adjusts the illumination signal L(x, y) to enhance details in dark image regions. The unit 302 utilizes an enhancement parameter gamma γ based on the image contents, local brightness, and global brightness of the illumination signal L(x,y). The unit 302 analyses and controls the estimated illumination signal L(x,y) to decrease the illumination effect on an object surface in the image.

In order to obtain a first control value $\gamma_1$, a content analysis function is performed by the components 400, 402, 404, and 406 of the mapping unit 302. The LPFs 400 and 402 perform low pass filtering with different window sizes, m×n, and M×N, respectively. The size of the second window (M×N) is larger than that of the first window (m×n) (e.g., default window sizes can be 3×5 and 3×11 for the first and second LPFs 400 and 402, respectively). Then, a difference measure d between the two windows at each pixel location (x,y) is obtained by the summer 401, according to relation (5) below:

$$\begin{aligned} d(x, y) &= \frac{\sum_{i=1}^{m}\sum_{j=1}^{n} L(i, j)}{m\times n} - \frac{\sum_{i=1}^{M}\sum_{j=1}^{N} L(i, j)}{M\times N} \\ &= \left(\frac{1}{m\times n} - \frac{1}{M\times N}\right)\cdot \sum_{i=1}^{m}\sum_{j=1}^{n} L(i, j) - \frac{\sum_{i=m+1}^{M}\sum_{j=n+1}^{N} L(i, j)}{M\times N}. \end{aligned} \tag{5}$$

Then, the difference d at each pixel location is inputted to the averaging unit 404 which is depicted as E[·] in FIG. 4. The averaging unit 404 provides an average value $\epsilon_d$ of the difference values d(x,y) over the entire image according to relation (6) below:

$$\varepsilon_d = \frac{1}{|S|} \cdot \sum_{x,y \in S} |d(x, y)|, \quad (6)$$

where |S| is total size of the input image. The output of the averaging unit 404 is inputted to a determine function unit 406 for deciding if the input image needs to be processed or not. The unit 406 generates a determined value $\gamma_1$, at each pixel location (x,y), wherein $\gamma_1 = 1 - g(\epsilon_d)$. The shape of the determine function g(x) is the same as the function described in 300 except for input parameters.

The averaging unit 404 indicates the amount of high frequency components (i.e., image detail) in the image. The mapping unit 302 is applied to the image including appropriate image details, to protect simple image or several solid color images from being processed with color shift or distortion. The image enhancement method is preferably utilized for input images which have enough high frequency contents so as not to be totally homogeneous or simply solid color images.

An analysis function is performed by the brightness ratio function 408 and the threshold function 410 to compute image brightness ratio and determine if it is necessary to process more for correcting the brightness at the local position (x,y). The threshold function 410 generates a second control value.

The refined gamma value (first control value) $\gamma_1$ is combined with the second control value $\gamma_2$ for modifying the local brightness value considering global brightness value over the entire input image.

In order to obtain the second control value $\gamma_2$, a brightness ratio B is defined at each position (x,y) in the brightness ratio unit 408 according to relation (7) below:

$$B(x, y) = \frac{L(x, y)}{G + L(x, y)}, \quad (7)$$

wherein G is an average brightness of the illumination image L(x,y). Concatenating the brightness ratio B(x,y) in the unit 408 with the threshold function 410 provides the second gamma control value $\gamma_2$ which is defined by $\gamma_2 = g(B)$. The threshold function 410 is the same shape as 300 with different parameter settings.

According to the process by the units 408 and 410, if the brightness ratio B(x,y) of a local value L(x,y) is less than a certain threshold, the possibility to enhance the input image is high, while the possibility is low if the brightness ratio is high enough.

To prevent unnecessary operation on the proper bright or high contrast image components against dark areas, the global brightness value G should be taken into account according to a global brightness level. In this embodiment, the global brightness value G is changed adaptively according to overall image brightness. For an example, the global brightness value is reduced if the global brightness level is too high. As a result, the brightness ratio B(x,y) will be higher, and the second gamma control value $\gamma_2$ will be smaller.

After determining the two gamma control values $\gamma_1$ and $\gamma_2$ for each pixel location (x,y) and then generating a product $\gamma_1 \cdot \gamma_2$ using the multiplier 403, the product $\gamma_1 \cdot \gamma_2$ is low-pass-filtered in the LPF 412 over the gamma field γ for each illumination pixel location, to generate 1/γ wherein $\gamma = 1 + (\gamma_0 - 1) \cdot LPF(\gamma_1 \cdot \gamma_2)$. The value $\gamma_0$ represents a user input, which should be larger than 1. The user input suggests how much image enhancement should be applied to the input image according to the present invention. Based on the user input, the correction value γ is adjusted by analyzing the image contents.

Then, the value 1/γ is raised to the power of the value of the estimated illumination by the exponent unit 405, and the corrected value is multiplied by the reflectance R(x,y) by the combiner 306 in a pixel-to-pixel basis to generate $Y'_{IN}(x,y)$, wherein the output $Y'_{IN}(x,y)$ is expressed by relation (8) below:

$$Y'_{IN}(x, y) = L_{max} \cdot \left(\frac{L(x, y)}{L_{max}}\right)^{1/\gamma} \cdot R(x, y). \quad (8)$$

In relation (8) above normalization is performed first by dividing each value by the maximum value $L_{max}$ of the input image, and scaled back to the original scale by multiplying the maximum value. For example, $L_{max}$ can be 255 or 1023 for an 8-bit or 10-bit input image, respectively.

While the present invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for processing an input image, comprising: employing a processor for providing digital input image pixels indexed to represent positions on a display, each pixel being indicative of an intensity value for each position; and determining pixel illumination correction for a pixel based on control parameters computed based on content and the local brightness of said input image, and adjusting the intensity value for the pixel based on the illumination correction to generate an enhanced value, wherein determining pixel illumination correction further includes:

estimating the local illumination of the input image by performing a weighted low pass filter (WLPF) operation on the image pixels;

separating the filtered image into illumination and reflectance images;

adjusting the pixel intensity value of the illumination images using a non-linear mapping function as illumination correction, based on the estimated local illumination at each pixel location, wherein adjusting said intensity value using said illumination correction further includes:

separating said input image $Y_{IN}(x,y)$ into illumination image L(x,y) and reflectance image R(x,y) as $Y_{IN}(x, y) = L(x,y) \cdot R(x,y)$, correcting the illumination image L(x,y) by calculating $$Y'_{IN}(x, y) = L_{max} \cdot \left(\frac{L(x, y)}{L_{max}}\right)^{1/\gamma} \cdot R(x, y),$$

where $Y'_{IN}(x,y)$ is the corrected illumination image, $L_{max}$ is the maximum value of the input image, and $\gamma$ is the correction value; and combining the adjusted illumination image with the reflectance image to generate an output image, wherein said illumination image is estimated by using a weighted low pass filter of the size m×n as:

$$L(x, y) = \frac{\sum_{i=1}^{m}\sum_{j=1}^{n} g(|Y_{IN}(i, j) - Y_{IN}(x, y)|) \cdot Y_{IN}(i, j)}{\sum_{i=1}^{m}\sum_{j=1}^{n} g(|Y_{IN}(i, j) - Y_{IN}(x, y)|)},$$

wherein the weighting function g(X) is determined as:

$$g(X) = \begin{cases} 0, \text{ if } X > \sigma \cdot \tau_2, \\ -\frac{1}{(\tau_2 - \tau_1) \cdot \sigma} \cdot (X - \sigma \cdot \tau_2), \text{ else if } X > \sigma \cdot \tau_1, \\ 1, \text{ otherwise} \end{cases}$$

wherein X is an input intensity difference value, $\sigma$ is an predefined variance, and $\tau_1$ and $\tau_2$ are first and second thresholds, respectively.

2. The method of claim 1 further comprising performing contrast enhancement on the output image to generate an enhanced image.

3. The method of claim 2 further including correcting the contrast of the image by calculating $$Y_{OUT}(x, y) = \frac{\sigma_{Y_{IN}}}{\sigma_{Y'_{IN}}} \cdot \{Y'_{IN}(x, y) - Y'_{mean}(x, y)\} + Y_{mean}(x, y)$$

where, $Y_{OUT}(x,y)$ represents the contrast corrected output image, $\sigma_z$ represents a standard deviation of an image Z, and $Z_{mean}$ is a mean value of Z at the location (x,y).

4. The method of claim 3 wherein said correction value $\gamma$ is determined by calculating $\gamma=1+(\gamma_0-1)\cdot LPF(\gamma_1 \cdot \gamma_2)$, where $\gamma_0$ is a user input greater than 1, LPF(x) indicates low pass filtering, $\gamma_1$ and $\gamma_2$ are first and second control parameters computed based on the content and the local brightness of said input image, respectively.

5. The method of claim 4 further including the steps of calculating wherein the first control parameter $\gamma_1$ as:

$\gamma_1=1-g(\epsilon_d)$, where $\epsilon_d$ represents average value of difference values d(x,y) at each pixel location (x,y) between two windows over the entire image, with different window sizes, m×n, and M×N, respectively.

6. The method of claim 5 further including the step of calculating the average value $\epsilon_d$ as:

$$\varepsilon_d = \frac{1}{|S|} \cdot \sum_{x,y \in S} |d(x, y)|,$$

wherein |S| represents total size of the input image.

7. The method of claim 4 wherein the second control parameter $\gamma_2$ is computed as: $\gamma_2=g(B)$, wherein B(x,y) represents brightness ratio at a pixel location (x,y).

8. The method of claim 7 further including the steps of determining the brightness ratio B(x,y) as:

$$B(x, y) = \frac{L(x, y)}{G + L(x, y)},$$

wherein G is an average brightness of the illumination image L(x,y).

9. An image enhancement system for enhancing a digital input image comprising pixels, the system comprising:

means for receiving digital input image pixels indexed to represent positions on a display, each pixel being indicative of an intensity value for each position; and an illumination correction module that performs local illumination correction by determining pixel illumination correction value for a pixel, and correcting the intensity value for the pixel based on control parameters computed based on content and the local brightness of said input image the illumination correction value to generate an enhanced value, the illumination correction module further comprises:

an illumination estimator that estimates the local illumination of the input image by performing a weighted low pass filter (WLPF) operation on the image pixels to generate the illumination correction value;

a separation module that separates the filtered image into illumination and reflectance images, an adjustment module that corrects said intensity value by adjusting said pixel intensity value of the illumination image using a non-linear mapping function as illumination correction value based on the estimated local illumination at each pixel location; and a combining module that combines the adjusted illumination image with the reflectance image to generate an output image; and a contrast enhancement module that performs contrast enhancement on the output image to generate an enhanced output image, wherein:

the separation module separates the input image $Y_{IN}(x,y)$ into illumination image L(x,y) and reflectance image R(x,y) as $Y_{IN}(x,y)=L(x,y)\cdot R(x,y)$, the adjustment module adjusts said intensity value using said illumination correction value further by adjusting the illumination image L(x,y) by calculating $$Y'_{IN}(x, y) = L_{max} \cdot \left(\frac{L(x, y)}{L_{max}}\right)^{1/\gamma} \cdot R(x, y),$$

where $Y'_{IN}(x,y)$ is the corrected illumination image, $L_{max}$ is the maximum value of the input image, and $\gamma$ is the correction value, and the separation module estimates the illumination image L(x,y) further by using a weighted low pass filter of the size m×n as:

$$L(x, y) = \frac{\sum_{i=1}^{m}\sum_{j=1}^{n} g(|Y_{IN}(i, j) - Y_{IN}(x, y)|) \cdot Y_{IN}(i, j)}{\sum_{i=1}^{m}\sum_{j=1}^{n} g(|Y_{IN}(i, j) - Y_{IN}(x, y)|)},$$

wherein the weighting function g(X) is determined as:

$$g(X) = \begin{cases} 0, \text{ if } X > \sigma \cdot \tau_2, \\ -\frac{1}{(\tau_2 - \tau_1) \cdot \sigma} \cdot (X - \sigma \cdot \tau_2), \text{ else if } X > \sigma \cdot \tau_1, \\ 1, \text{ otherwise} \end{cases}$$

wherein X is an input intensity difference value, $\sigma$ is a predefined variance, and $\tau_1$ and $\tau_2$ are first and second thresholds, respectively.

10. The system of claim 9 wherein the contrast enhancement module corrects the contrast of the image by calculating $$Y_{OUT}(x, y) = \frac{\sigma_{Y_{IN}}}{\sigma_{Y'_{IN}}} \cdot \{Y'_{IN}(x, y) - Y'_{mean}(x, y)\} + Y_{mean}(x, y)$$

where, $Y_{OUT}(x,y)$ represents the contrast corrected output image, $\sigma_Z$ represents a standard deviation of an image Z, and $Z_{mean}$ is a mean value of Z at the location (x,y).

11. The system of claim 10 wherein the adjustment module further determines an adjustment value $\gamma$ for adjusting said intensity value, by calculating $\gamma=1+(\gamma_0-1)\cdot LPF(\gamma_1 \cdot \gamma_2)$, where $\gamma_0$ is a user input greater than 1, LPF(x) indicates low pass filtering, $\gamma_1$ and $\gamma_2$ are first and second control parameters computed based on the content and the local brightness of said input image, respectively.

12. The system of claim 11 wherein the adjustment module calculates the first control parameter $\gamma_1$ as:

$\gamma_1=1-g(\epsilon_d)$, where $\epsilon_d$ represents average value of difference values d(x,y) at each pixel location (x,y) between two windows over the entire image, with different window sizes, m×n, and M×N, respectively.

13. The system of claim 12 wherein the adjustment module further calculates the average value $\epsilon_d$ as:

$$\varepsilon_d = \frac{1}{|S|} \cdot \sum_{x,y \in S} |d(x, y)|,$$

wherein |S| represents total size of the input image.

14. The system of claim 11 wherein the adjustment module calculates the second control parameter $\gamma_2$ as: $\gamma_2=g(B)$, wherein B(x,y) represents brightness ratio at a pixel location (x,y).

15. The system of claim 14 wherein adjustment determining the brightness ratio B(x,y) as:

$$B(x, y) = \frac{L(x, y)}{G + L(x, y)},$$

wherein G is a average brightness of the illumination image L(x,y).

16. The method of claim 1, wherein the content comprises high frequency components and low frequency components of the input image.

* * * * *